United States Patent [19]

Soethout

[11] Patent Number: 4,970,947
[45] Date of Patent: Nov. 20, 1990

[54] AIR OUTLET FOR INTERIOR SPACES, PARTICULARLY FOR THE INTERIOR SPACE OF A MOTOR VEHICLE

[75] Inventor: Freddie Soethout, Pulheim, Fed. Rep. of Germany

[73] Assignee: Siemens Aktiengesellschaft, Berlin & Munich, Fed. Rep. of Germany

[21] Appl. No.: 412,194

[22] Filed: Sep. 25, 1989

[30] Foreign Application Priority Data

Sep. 26, 1988 [DE] Fed. Rep. of Germany ....... 3832956

[51] Int. Cl.⁵ .............................................. B60H 1/34
[52] U.S. Cl. ......................................... 98/2; 98/40.24
[58] Field of Search ................. 98/2, 40.24, 40.26, 98/94.2, 107, 110

[56] References Cited

U.S. PATENT DOCUMENTS

| 2,034,231 | 3/1936 | Fox | 98/40.24 X |
| 2,224,312 | 12/1940 | O'Day | 98/110 |
| 2,991,707 | 7/1961 | Goettl | 98/40.24 |
| 3,636,854 | 1/1972 | Cary | 98/110 |
| 3,648,590 | 3/1972 | Mercier | 98/2 |

FOREIGN PATENT DOCUMENTS

| 2444116 | 3/1976 | Fed. Rep. of Germany . | |
| 2029929 | 10/1970 | France . | |
| 244619 | 12/1985 | Japan | 98/2 |
| 79105 | 9/1955 | Netherlands | 98/40.24 |
| 718400 | 11/1954 | United Kingdom . | |
| 1310009 | 10/1968 | United Kingdom . | |
| 1227157 | 4/1971 | United Kingdom | 98/2 |

OTHER PUBLICATIONS

Umwelt, Bild Der Wissenschaft, 4/1988, Audi 200 quattro.

Primary Examiner—Harold Joyce
Attorney, Agent, or Firm—Kenyon & Kenyon

[57] ABSTRACT

An air outlet having a housing with stationary and swivelling lamellae which are arranged to influence air circulation. the stationary lamelae are arranged parallel to each other. The swivelling lamellae are pivotally supported in the housing about their respective swivel axis which are parallel to each other and perpendicular to the stationary lamellae. Each swivelling lamella includes first and second cooperating partial lamellae, each of which includes at least one lamellar tongue. Each tongue of the first partial lamella is positioned adjacent to a tongue of the second partial lamella such that the tongues are arranged to alternate with each other and operatively associate a respective swivelling lamellae with stationary lamellae. The first and second cooperating partial lamellae of each swivelling lamella are coupled to each other to permit independent displacement of each partial lamella so that the outlet may be adjusted to diffuse the air passing therethrough.

7 Claims, 3 Drawing Sheets

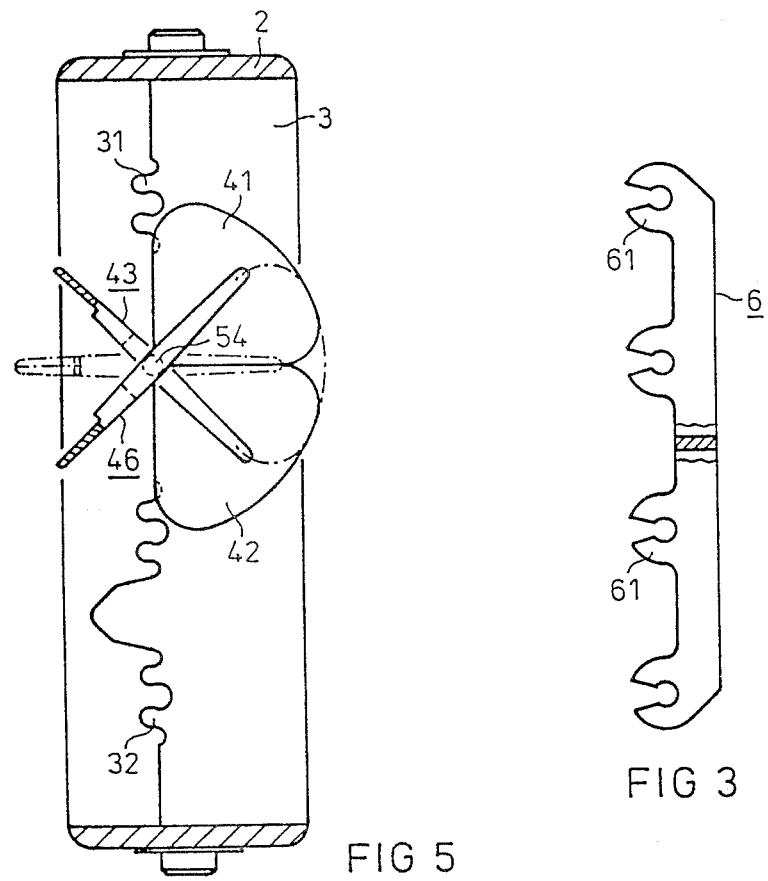
FIG 5
FIG 3
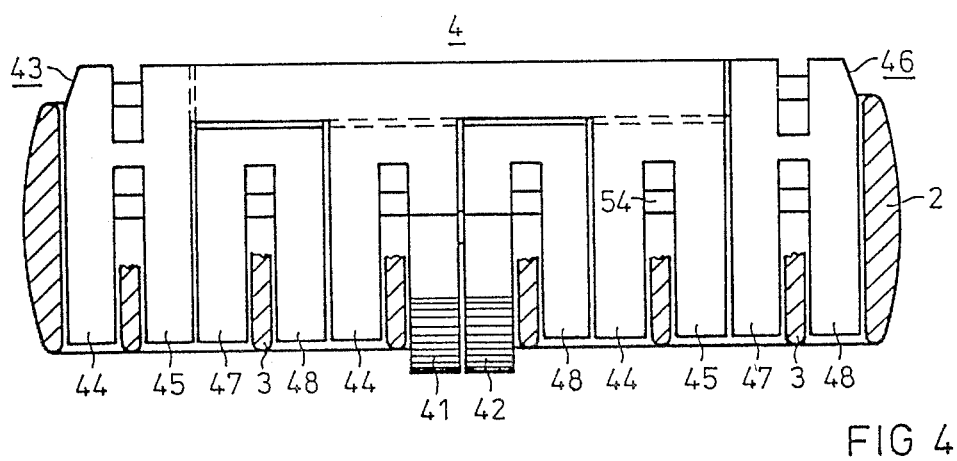
FIG 4

AIR OUTLET FOR INTERIOR SPACES, PARTICULARLY FOR THE INTERIOR SPACE OF A MOTOR VEHICLE

BACKGROUND OF THE INVENTION

This invention relates generally to the ventilation of interior spaces, and more particularly to an air outlet that expels air having air flow characteristics which may be varied by swivelling lamellae. These types of air outlets are particularly suited for applications in motor vehicles.

An air outlet, which is used to ventilate the interior space of motor vehicles, is generally known. Such an outlet generally comprises a rotatably supported housing section with several stationary and several swivelling lamellae which are used to influence air circulation. The stationary lamellae are arranged parallel to each other and perpendicular to the swivelling lamella which are pivotally supported with their pivotal axes parallel to each other. Furthermore, each swivelling lamella has several lamellar tongues which mate with the stationary lamellae. When air flows through the outlet, the stationary and swivelling lamellae produce a compact air jet. The direction of the air jet may be adjusted by manipulating the rotatably supported housing section and the swivelling lamellae as in the air outlet for automobile type AUDI 200 quattro (year of manufacture 1988).

Another known air outlet, used to ventilate the interior space of motor vehicles, can produce either a concentrated or a diverging air jet. For this purpose, the discharge port of the air outlet is subdivided by air baffles into lattice-like form to provide a greater number of air guide ducts. By jointly swivelling the baffles, which gives the air outlet the form of a spherical segment, certain air baffles can be inclined relative to the axis of the air outlet. As a result, the discharge directions of the air guide ducts diverge from the axis of the air outlet. Accordingly, the air jet that emerges from the air outlet is fanned out in different directions. To adjust this air jet, the air baffles can be connected in a swivelling arrangement by two crosswise-arranged tension springs. (German Published Patent Application: No. 24 44 116).

The air outlets described above provide either a compact jet or diverging air flow either of which may be desirable at certain times. Thus, there is a need to develop an air outlet which not only can produce a compact jet and provide directional adjustability thereof, but which also can produce diffused air flow and provide adjustability for the degree of diffusion.

SUMMARY OF THE INVENTION

The present invention is directed to an air outlet that avoids the above-mentioned problems and disadvantages of the prior art by providing an air outlet that expels air having air flow characteristics that may be varied. The invention accomplishes this goal by providing an air outlet comprising a housing with stationary and swivelling lamellae arranged therein and coupled together to influence air flow through the air outlet. The stationary lamellae are arranged parallel to each other. The swivelling lamellae are pivotally supported in the housing about their pivotal axes which are arranged parallel to each other and perpendicular to the stationary lamellae. Each swivelling lamellae includes first and second cooperating partial lamellae mounted for independent swivelling. Each partial lamella includes tongues disposed between stationary lamellae such that the tongues of the first partial lamella alternate with the tongues of the second partial lamella.

By developing the air outlet in this manner and by using simple structural means, an important new function is given to this air outlet. Specifically, in addition to generating a compact jet, the air outlet can also generate diffused air flow. This is particularly advantageous for motor vehicles equipped with air conditioning, as compact jets of cool or cold air are generally unpleasant for the person sitting directly near the air outlet.

An especially advantageous refinement of the new air outlet is that each lamellar tongue includes a slot into which one of the stationary lamellar extends. With such a refinement, by varying the position of both partial lamellae to have different orientations, one achieves an especially effective turbulence of the discharging air. This results from two adjacent partial tongues of adjacent lamellar tongues of different partial lamellae producing different air discharge directions within a given space between two adjacent stationary lamella, i.e., the differently directed discharge streams are not separated by a stationary lamella.

The diffused characteristic flow property of the air outlet of the present invention can also be improved by varying the distance between the coupling point at which a respective partial lamella is pivotally coupled to a coupling shank, and the coupling point at which the first and second partial lamella of a respective swivelling lamella are coupled together from first partial lamella to first partial lamella. In this manner, different inclinations of the individual partial lamellae along one of the coupling shanks can be attained.

BRIEF DESCRIPTION OF THE DRAWINGS

FIG. 3 is a side elevational view of a shank which couples or connects several partial lamellae;

FIG. 4 is a top plan view of a swivelling lamella showing two slotted partial lamellae components therefore illustrating their relationship to the stationary lamellae within a housing section;

FIG. 5 is a lateral view of a vertical section through the air outlet with two swivelling partial lamellae according to FIG. 4;

DETAILED DESCRIPTION

Figure 1:
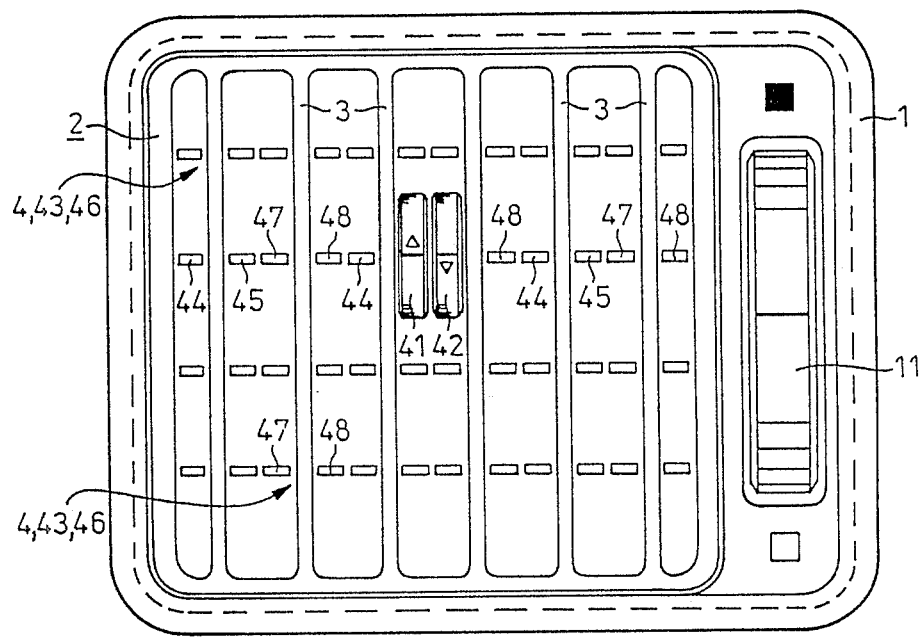
FIG. 1 a front elevational view of an air outlet according to a first embodiment on the present invention having swivelling partial lamellae with slotted lamellar tongues.

The air outlet according to FIG. 1 comprises frame 1 in which a housing section 2 is rotatably supported about its vertical center axis. Vertically arranged stationary lamellae 3 and horizontally arranged swivelling lamellae 4 are provided in housing section 2. Each of the four swivelling lamellae (4), illustrated in FIG. 1, are arranged with a horizontal swivel shaft and comprise two cooperating swivelling partial lamellae 43 and 46 with lamellar partial tongue pairs 44, 45 and 47, 48, respectively. The lamellar partial tongues, adjacent stationary lamellae 3, operatively engage with stationary lamellae 3 and mate therewith. Two adjusting elements 41 and 42 are provided to turn the partial lamellae, which are pivotally coupled to each other. A further adjusting element 11, mounted in the frame 1, is used to close or open the air outlet. The orientation of swivelling lamellae 4, illustrated in FIG. 1, provides a concentrated air jet which flows horizontally out of the air outlet.

Figure 2:
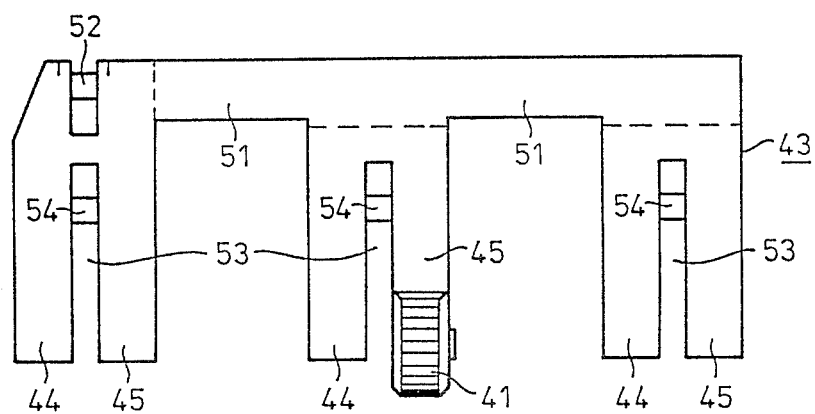
FIG. 2 is a top plan view of a partial lamella that constitutes a component of a swivelling lamella which in turn constitutes a component of the air outlet of FIG. 1.

Referring to FIG. 2, partial lamella 43 includes three lamellar tongues each of which is formed by a pair of lamellar partial tongues 44, 45. The lamellar tongues are interconnected by means of crosspiece 51, which includes coupling shaft 52. Furthermore, swivel shaft 54 is provided in slot 53 formed between each lamellar partial tongue pair 44, 45. The design of partial lamella 46 is similar to that of partial lamella 43. The reciprocal arrangement of the two partial lamellae 43 and 46, respectively, follows in such a way that the partial lamellae 46 are arranged in a turned-over position with respect to the partial lamella position depicted in FIG. 1. Thus, each lamellar tongue of partial lamella 46 is positioned between or adjacent to a lamellar tongue of partial lamellae 43, i.e., the lamellar tongues of partial lamella 46 alternate with the lamellar tongues of cooperating partial lamella 43 (FIG. 4).

Referring to FIG. 3, a coupling shank 6 is provided with fastening bearing projections 61 to receive coupling shafts 52 to couple several similarly arranged partial lamellae 43 or 46. Another coupling shank similar to coupling shank 6 also coupled several similarly arranged partial lamellae so that cooperating partial lamella 43, 46 which are coupled through two such shanks may independently rotate.

Returning to FIG. 4, which shows a top view of a horizontal section through the air outlet depicted in FIG. 1, a swivelling lamella 4 is illustrated. Swivelling lamella 4 is arranged in housing section 2 with the stationary lamellae 3 and comprises both partial lamellae 43 and 46. Both coupling shanks, each of which is used to connect the same kind of partial lamellae, are not depicted here. The swivelling lamellae and the stationary lamellae are arranged so that one stationary lamella 3 extends into each slot formed between a partial tongue pair of a partial lamella, i.e., lamella 3 extends into each slot formed between partial tongues 44 and 45 or 47 and 48 of the swivelling lamellae.

The swivelling partial lamellae 43 and 46 can be swivelled together upwardly or downwardly to adjust the direction of a compact air jet. To produce a diffused air flow, partial lamellae 43 and 46 can be swivelled in opposite directions, as illustrated in FIG. 5. According to FIG. 5, the partial lamella 43 is swivelled downwardly and the partial lamella 46 is swivelled upwardly, each by approximately 45° to the horizontal. However, each partial lamella can also occupy intermediate positions between 0° and 45° to provide different degrees of diffusion. In addition, it is apparent from FIG. 5, that the stationary lamellae 3 are provided with bearing projections 31, into which the swivel shafts 54 of the swivelling lamellae are fastened.

Figure 6:
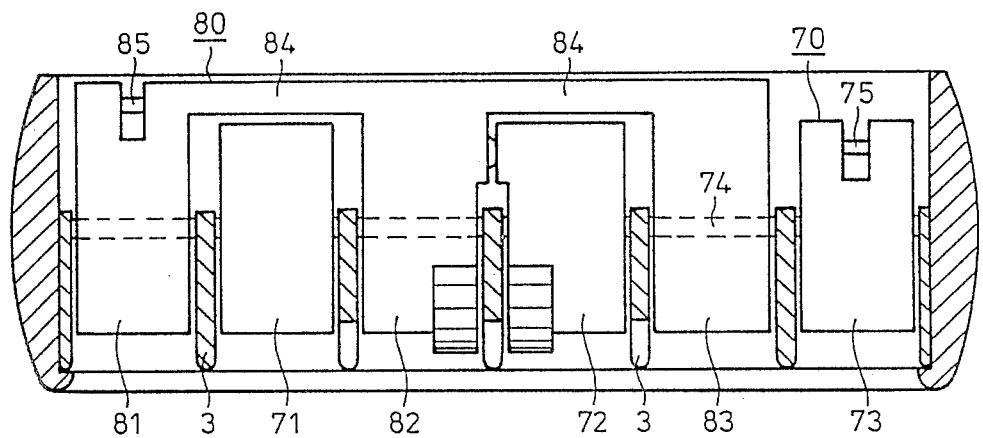
FIG. 6 is a top plan view of two partial lamellae illustrating their relationship to the stationary lamellae within a housing section according to another embodiment having swivelling partial lamellae with non-slotted lamellar tongues.
Figures 7, 8:
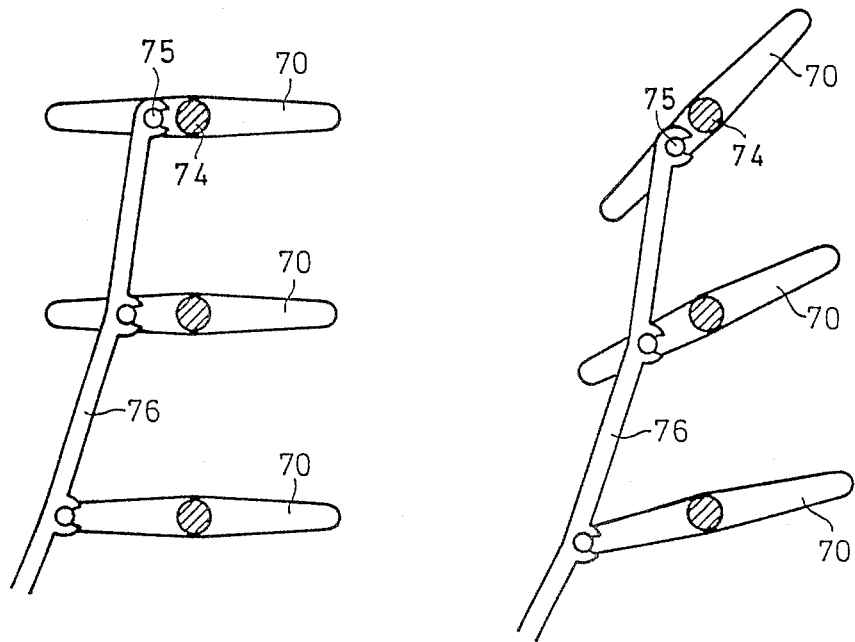
FIGS. 7 and 8 are schematic views of the relationship between a coupling shank and several partial lamellae according to a further embodiment.

In the embodiment exemplified in FIG. 6, two partial lamellae 70 and 80 are illustrated in a manner similar to FIG. 4. Partial lamella 70 comprises three lamellar tongues 71, 72 and 73, which are interconnected via swivel shaft 74. Coupling shaft 75 is provided in lamellar tongue 73 to couple partial lamella 70 to coupling shank 76 (FIG. 7). Partial lamella 80 comprises three lamellar tongues 81, 82 and 83, which are arranged alternately with the lamellar tongues 71, 72 and 73 and are connected to each other via crosspieces 84. Furthermore, coupling shaft 85 is provided in lamellar tongue 81 to couple partial lamella 80 to coupling shank 76. Recesses in lamellar tongues 81, 82 and 83 are positioned to correspond and align with swivel shaft 74 of partial lamella 70, so that partial lamella 80 can be fastened or coupled to partial lamella 70 via shaft 74. A stationary lamella is positioned between an alternating pair of tongues (81 and 71, 82 and 72, and/or 83 and 73).

FIG. 7 schematically represents several partial lamellae 70 interconnected by coupling shank 76. Although not illustrated, it should be understood that another coupling shank like coupling shank 76 is used in combination therewith to couple respective partial lamellae 70, 80 to each other. It can be seen that the distance between the coupling points, coupling individual partial lamellae with shank 76, and a respective swivel shaft (74) varies, i.e., the distances therebetween differ. Thus, when the lowest partial lamellae are pivoted by a certain degree, their inclination changes by a certain degree (FIG. 8). However, when the above-described distance is reduced, in accordance with the upper partial lamella of FIGS. 7 and 8, a greater change in inclination results.

The coupling of both partial lamellae 80 may be arranged in the same manner. Furthermore, the partial lamellae according to FIG. 4 also may be coupled to each other in this manner.

What is claimed is:

1. An air outlet for interior spaces comprising:
   a. a housing;
   b. a plurality of stationary lamellae disposed parallel to each other in said housing; and
   c. a plurality of swivelling lamellae each having a swivel axis and being pivotally mounted in said housing for rotation about its respective swivel axis, said swivel axes being parallel to each other and perpendicular to said stationary lamellae, each swivelling lamella including first and second partial lamellae mounted for independent swivelling, said first and second partial lamellae including tongues disposed between said stationary lamellae such that the tongues of said first partial lamella alternate with the tongues of said second partial lamella.

2. The air outlet of claim 1 wherein each lamellar tongue includes a slot into which one of said stationary lamellae extends.

3. The air outlet of claim 2 further including first and second coupling shanks respectively pivotally coupling thereto the first and second partial lamellae.

4. The air outlet of claim 1 further including first and second coupling shanks respectively pivotally coupling thereto the first and second partial lamellae.

5. The air outlet of claim 4 wherein each first partial lamella of a respective swivelling lamella is coupled to one of said shanks at a first coupling point, the distance between each first coupling point and the swivel axis of the respective swivelling lamella varies from swivelling lamella to swivelling lamella.

6. The air outlet of claim 3 wherein each first partial lamella of a respective swivelling lamella is coupled to one of said shanks at a first coupling point, the distance between each first coupling point and the swivel axis of the respective swivelling lamella varies from swivelling lamella to swivelling lamella.

7. An air outlet for discharging air into the passenger compartment of a motor vehicle comprising:
- a housing;
- a plurality of stationery lamellae disposed parallel to each other in said housing;
- a plurality of swivelling lamellae each having a swivel axis and being pivotally mounted in said housing for rotation about its respective swivel axis, said swivel axes being parallel to each other and perpendicular to said stationary lamellae;
- each swivelling lamella including discrete first and second partial lamellae that are pivotally coupled to one another along a respective one of said swivel axes and independently mounted in said housing such that said first and second partial lamellae swivel independently of one another; and
- said first and second partial lamellae including tongues disposed between said stationary lamellae such that the tongues of said first partial lamella alternate with the tongues of said second partial lamella.

* * * * *